2 Sheets—Sheet 2.
J. FOWLER, Jr.
Steam-Plow.
No. 45,892. Patented Jan. 10, 1865.
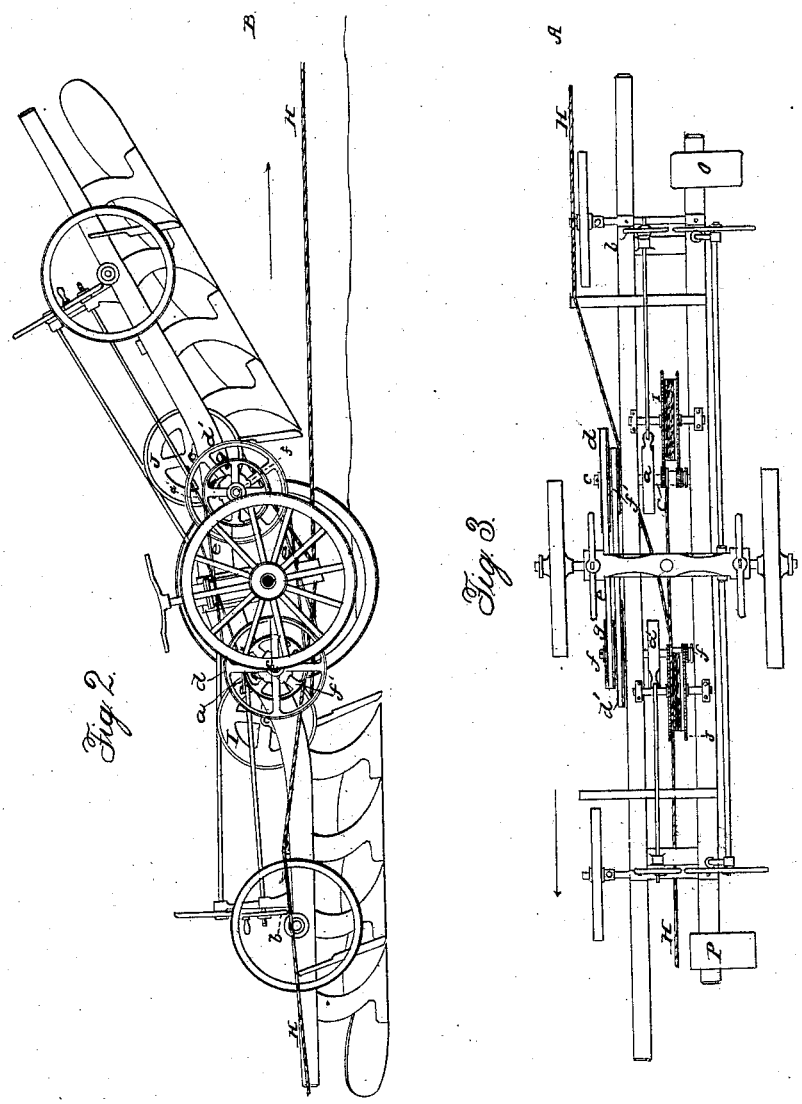
Witnesses:
Inventor.

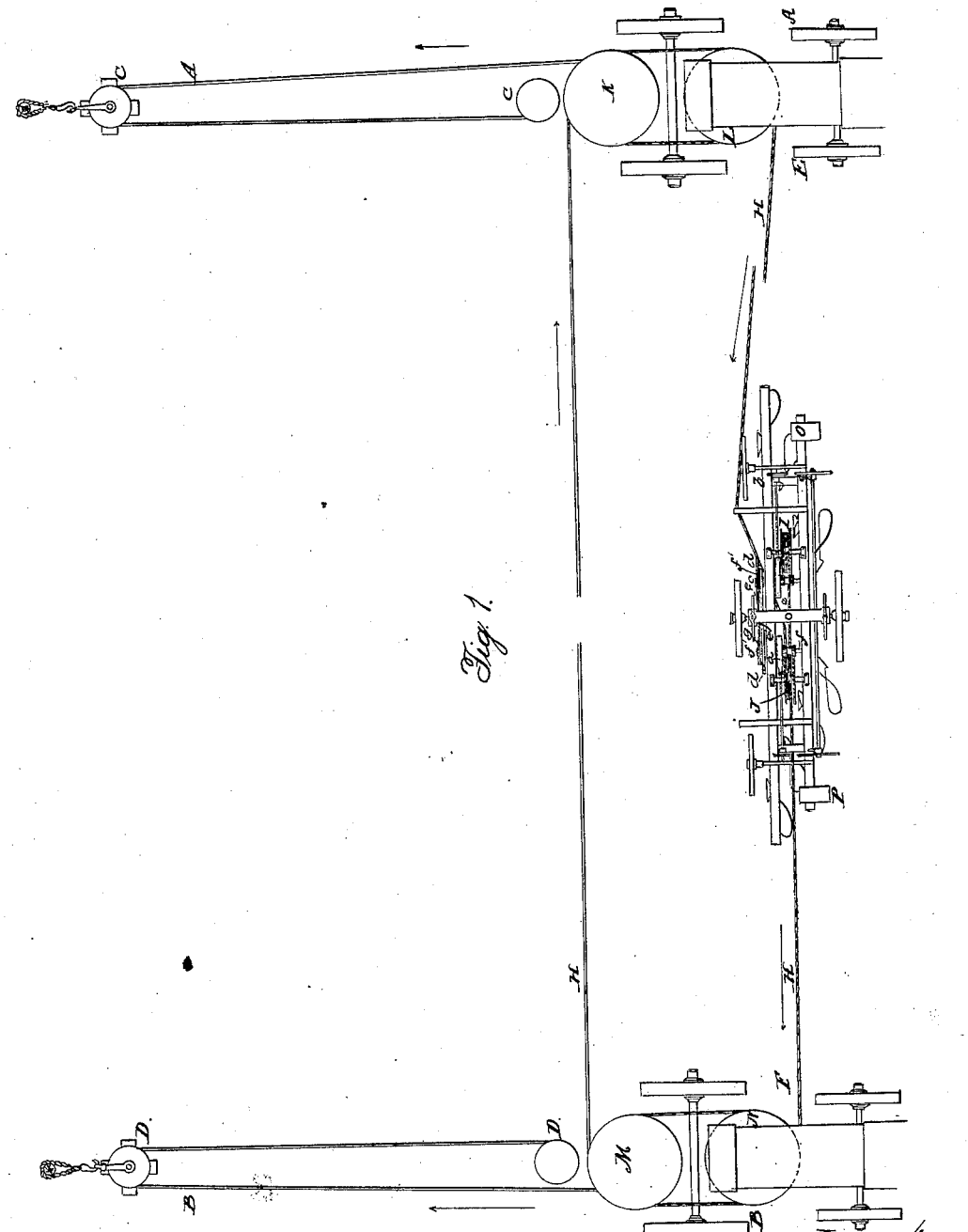

UNITED STATES PATENT OFFICE.

JOHN FOWLER, JR., OF CORNHILL, ENGLAND, ASSIGNOR TO WM. P. TATHAM, OF PHILADELPHIA, PENNSYLVANIA.

CULTIVATING LAND BY STEAM.

Specification forming part of Letters Patent No. 45,892, dated January 10, 1865.

*To all whom it may concern:*

Be it known that I, JOHN FOWLER, Jr., of Cornhill, England, have invented certain new and useful Improvements in Apparatus for Cultivating Land by Steam-Power; and I do hereby declare that the following is a full, clear, and exact description thereof, reference being had to the accompanying drawings, making part of this specification, in which—

Figure 1 is a plan representing two engines on opposite headlands to act in conjunction for hauling plows or other tilling instruments; and Fig. 2 is a side elevation, and Fig. 3 a plan of the plows.

The same letters indicate like parts in all the figures.

This invention consists in the employment of two engines mounted on separate carriages stationed on opposite headlands, both engines being connected and combined by an endless rope, to which plows or other tilling implements may be attached, so that the power of both engines, acting simultaneously on the said endless rope, and alternately in opposite directions, will cause the tilling implements to be hauled alternately in opposite directions across a field by the joint power of both engines.

It is not deemed necessary to describe or represent the construction of the engines, as any of the engines heretofore employed for hauling tilling instruments across fields will answer the purpose; and, in fact, any construction of engines will answer the purpose which can be placed on carriages so that their positions can be shifted along two opposite headlands, and which can impart motion to suitable drums alternately in opposite directions, both engines acting simultaneously on the rope.

In the accompanying drawings, A A and B B represent the two headlands, along which two suitable engines are to be progressively moved as the intervening land is tilled or treated by the agricultural implement for the time being used.

C C and D D are parts of the apparatus for moving the engines E and F along their respective headlands in the direction of the arrows, as is well known, and therefore not necessary to be described and represented. Each of the engines has two drums, both of which, or only one, may be geared with and driven by the engines.

H H is a rope which passes around the said drums, the two ends of which are fixed to two barrels, I J, which are carried by the plowing-machine. Hence the rope in action is endless; and in order that there may be no slack in this rope a quantity of the rope is, at the starting of the implement from a headland, wound on to one of the barrels, I or J, as will be hereinafter described. In the arrangement shown the plowing-machine is supposed to be moving from the headland A toward the headland B, and consequently the rope is moving in the direction of the arrows.

K L are the two drums of the engine at the headland A, and M N are the two drums of the engine at the headland B. These drums K L and M N are to be arranged to give motion to the rope H, first in one direction and then in the other, so as to move the agricultural implement attached thereto alternately to and from each of the headlands A and B, and the engines are also to be arranged suitably for moving along the headlands toward suitable anchoring apparatus, as is well understood. Moving the rope alternately in opposite directions is to be effected by any of the known means of reversing steam-engines and on the making of a signal, which is best done by the man on the tilling apparatus. Supposing the plowing-machine to be about to start from the headland A toward the headland B, the man accompanying the plows (who sits on the seat O when going from the headland A and on the seat P when going from the headland B) causes the break $a$ to be slackened off its wheel by means of the wheel $b$. Hence as the draft of the rope between the drum N is received by the drum or barrel I it will cause that barrel to move round, and in doing so it will give motion to the axis $c$, on which is a drum or pulley, $d$, which is held by means of a ratchet-wheel and clicks or catches from turning on the axis $c$ when that axis is put in motion by the endless rope H. The drum or pulley *d*, by a strap, *e*, gives motion to the axis *f*, which gives motion to the axle on which the barrel or pulley J is fixed, such strap *e* acting on the pulley or drum *g*, which is for the time fixed to the axis *f* by a ratchet-wheel and clicks or catches, and the pulley or barrel J will be caused to turn so much faster than the drum or barrel I that the slack of the rope H will be quickly taken up, when the man attending the machine will put on the brakes, so as to stop the axis of the drum or barrel I moving farther round. When the plowing-machine has arrived at the headland B the man attending it will take his seat on the end at P, and on the engine's being started, but in the reverse direction, the draft of the engines will bring the rope H to act first on the barrel or drum J, and its break *a'* being free of its wheel on the axis *f*, connected with the drum or barrel J, that axis will be caused to rotate, and it will give motion to a drum or pulley, *d'*, on the axis *f*, as above described in regard to a similar drum or pulley in connection with the axis of the barrel I, which will, by a strap, give motion to a pulley, *f'*, on the axis *c*, in connection with the drum or barrel I, and give motion thereto at a faster rate than that at which the barrel or drum J is turned by the rope H. The slack of that rope will consequently be wound on the barrel or drum I when the plowing-machine or other implement is about to be moved from the headland B toward the headland A. It should be stated that the drums or pulleys *d d'* and *f f'* are respectively fixed to their axes in one direction and turn freely thereon in the other direction, and the drums or pulleys *d* and *d'* are not both fixed to their axes at the same time. Neither are the drums or pulleys *f f'* fixed to their respective axes at the same time.

Having thus described the nature of my invention and the manner of performing the same, I would have it understood that I do not claim any of the mechanical parts separately, nor do I confine myself to the details; but

What I claim is—

The combination herein described, whereby the power of two engines situated on distant headlands is simultaneously employed in giving motion to an agricultural implement by an endless rope, in manner substantially as described, to haul the agricultural implement alternately to and from each headland, as herein explained.

JOHN FOWLER, JR.

Witnesses:
ROBT. FOWLER,
ROBT. WM. EDDISON.